United States Patent [19]

Feller

[11] Patent Number: 5,390,541
[45] Date of Patent: Feb. 21, 1995

[54] FLOW SENSOR INCORPORATING CYCLIC RELATIVE MOTION BETWEEN FLUID FLOW AND DETECTING ELEMENT

[76] Inventor: Murray F. Feller, Rte. 2 Box 562A, 21577 NW. 75th Ave. Rd., Micanopy, Fla. 32667

[21] Appl. No.: 134,590

[22] Filed: Oct. 12, 1993

[51] Int. Cl.6 .............................................. G01F 1/68
[52] U.S. Cl. .............................. 73/204.25; 73/204.22
[58] Field of Search ............ 73/204.11, 204.14, 204.21,
73/204.22, 204.25, 170.07, 170.08, 170.09,
170.12, 861.77

[56] References Cited

U.S. PATENT DOCUMENTS

| | | | |
|---|---|---|---|
| 2,620,658 | 12/1952 | Piety | 73/204.11 |
| 3,060,746 | 10/1962 | Gompper | 73/863.56 |
| 3,217,546 | 11/1965 | Cordell | 73/863.56 |
| 3,433,078 | 3/1969 | Thompson | 73/863.02 |
| 4,391,137 | 7/1983 | Kerfoot et al. | 73/204.22 |
| 4,829,833 | 5/1989 | Feller | 73/861.77 |
| 4,848,164 | 7/1989 | Quarve et al. | 73/861.77 |

Primary Examiner—Richard E. Chilcot, Jr.
Assistant Examiner—William L. Oen
Attorney, Agent, or Firm—Harness, Dickey & Pierce

[57] ABSTRACT

A flow meter for measuring extremely low flow rates of fluids by cyclically controlling the flow from a maximum to a minimum condition in the vicinity of a thermistor. The magnitude of the modulation component of the electric signal is representative of flow rate. In an alternate embodiment, the thermistor is cyclically moved in the flow stream to establish the modulation or the movement simulated by pumped flow past the thermistor.

20 Claims, 4 Drawing Sheets

FLOW SENSOR INCORPORATING CYCLIC RELATIVE MOTION BETWEEN FLUID FLOW AND DETECTING ELEMENT

The present invention relates generally to flow meters especially for measuring extremely low flow rates.

In particular, the present invention relates to flow meters having a predetermined component of electrical signals generated by one or more heated electrically-responsive temperature-sensitive sensors located in a fluid flow stream, whereby the sensor's electrical resistance changes in response to flow rate and enables a corresponding electrical signal to be obtained.

BACKGROUND OF THE INVENTION

There are flow metering applications where conventional metering devices, such as turbine and other inferential types, nutating disk and other positive displacement types, electromagnetic, acoustic, and pressure differential types, etc., are not used because of their inability to effectively respond to extremely low flow rates. Such extremely low flow rates are often less then 100 feet per hour, and are typically in the range of 0.1 to 10 feet per hour. These application examples include groundwater measurement as related to pollution monitoring and salt water intrusion, and aquaculture as related to the movement and distribution of food, waste and water circulation.

One form of currently available flow detector utilizes a heated temperature sensing element, such as a thermistor, whereby the thermistor heated by an electric current is cooled by fluid flow. The variation in flow rate influences the thermistor temperature and its voltage drop. While such a detector can respond to extremely low flow rates, the instability of its output signal because of the thermistor resistance or electronic circuit drifts, fluid temperature changes, and the buildup of scale (film or debris on the surface of the sensor acting as a thermo-insulator to the fluid) requires that it be constantly calibrated or corrected, and severely limits its usefulness. However, if another thermistor, similar to the first one is added to detect fluid temperature and thereby provide a means, for example, in a bridge circuit for drift compensation due to fluid temperature changes, the overall sensor drift will be substantially reduced. This arrangement is often used for gas flow measurement. However, even with the temperature compensated thermistor sensor, there are drifts and uncertainties which limit the practical usefulness of such instruments to a relatively high flow rate.

The prior art is exemplified by Piety U.S. Pat. No. 2,620,658; Gompper U.S. Pat. No. 3,060,746; Cordell et al. U.S. Pat. No. 3,217,546; Thompson U.S. Pat. No. 3,433,078 and Kerfoot et al. U.S. Pat. No. 4,391,137.

The present invention eliminates the disadvantages and shortcomings attendant the conventional prior art devices and techniques, and at the same time provides a device and method which permit accurate measurements of extremely low flow rates of fluids with a minimum of parts and an extremely surprisingly reduced cost of manufacture.

SUMMARY OF THE INVENTION

The present invention embodies a new flow detecting principle which can be utilized to produce devices capable of extremely low rate precision flow metering, and offers the additional feature of determining flow direction. The data from one or an array of these novel devices which are appropriately located enables the applicable monitoring to be performed with an unprecedented combination of practicality and precision.

The new flow detecting principle disclosed herein uses a heated temperature sensor past it is made to very periodically so that its output and a means for inducing cyclic relative motion between the fluid flow and the sensor. The fluid, in contact with and moving relative to the sensor, removes its heat and changes its temperature in a corresponding cyclic manner. This variation, that is the alternating or modulating component, is the only part of the signal which is used to provide a flow rate indication. As such, long drifts inherent in the sensor, its supporting electronics, and the temperature of the fluid have relatively little effect on the overall performance of the measuring device. When desired, the residual drifts can be compensated with relative ease by using a second temperature sensor to measure the fluid temperature and make automatic corrections to the calibration constant. While scale can still be a significant factor in the long term stability of the device, its effect is reduced.

The present invention provides a flow meter for measuring fluid flow rate, comprising one or more heated electrically-responsive temperature-sensitive sensing element disposed in a fluid flow environment. At least one of the heated electrically-responsive temperature-sensitive sensing elements generates an electrical signal in response to temperature changes produced by the fluid flow. The meter also includes first means for producing cyclical relative motion between the fluid flow and at least one of the heated electrically-responsive temperature-sensitive sensing elements. The meter also includes second means connected to at least one of the heated electrically-responsive temperature-sensitive sensing elements for measuring a predetermined portion of the electrical signal to obtain the rate of fluid flow.

In accordance with the present invention, one or more heated temperature sensors (e.g., thermistors) are located in the fluid flow stream. The electrical resistance of the sensor changes in response to flow rate, and enables a corresponding electrical signal to be obtained. In some embodiments of the present invention, the flow is cyclically controlled, i.e., modulated, from a minimum condition to a maximum condition by mechanical means within the vicinity of the sensor. The magnitude of the modulation component of the electrical signal is then representative of flow rate. Lower flow rates can be measured compared to conventional means because sensor drifts due to ambient temperatures or other slowly changing factors compared to the modulation frequency, have a relatively small effect on the magnitude of the modulation component.

There are several means for varying the fluid flow past the heated sensor. For example, rotating arrangements may be used whereby fluid direction in addition to flow rate can be determined.

In other embodiments of the present invention, the sensor (or sensors) is cyclically moved in the fluid flow stream, thereby establishing the modulation. In one embodiment, the sensor, which is located on a disk, is moved at a linear rate which is greater than the highest flow rate for which the instrument is rated. The magnitude of the modulation component of the signal is representative of flow rate. However, when the sensor velocity is controlled to equal that of the fluid flow stream, a representative signal as part of the controlling mechanism provides an indication of the flow rate. This method, which is relatively insensitive to modulation magnitude, provides even greater measurement precision.

In a variant of these embodiments, the sensor is stationary and the fluid is continuously pumped past the sensor, whereby this pumped fluid flow rate is aided or diminished by the fluid flow rate being measured.

It is an object of the invention to provide a flow meter which embodies a new flow detecting principle capable of extremely low rate precision flow metering, and offers the additional feature of determining flow direction.

Other objects and details of the invention will become apparent from the following description, when read in conjunction with the accompanying drawings.

DETAILED DESCRIPTION OF SOME PREFERRED EMBODIMENTS

Figure 1:
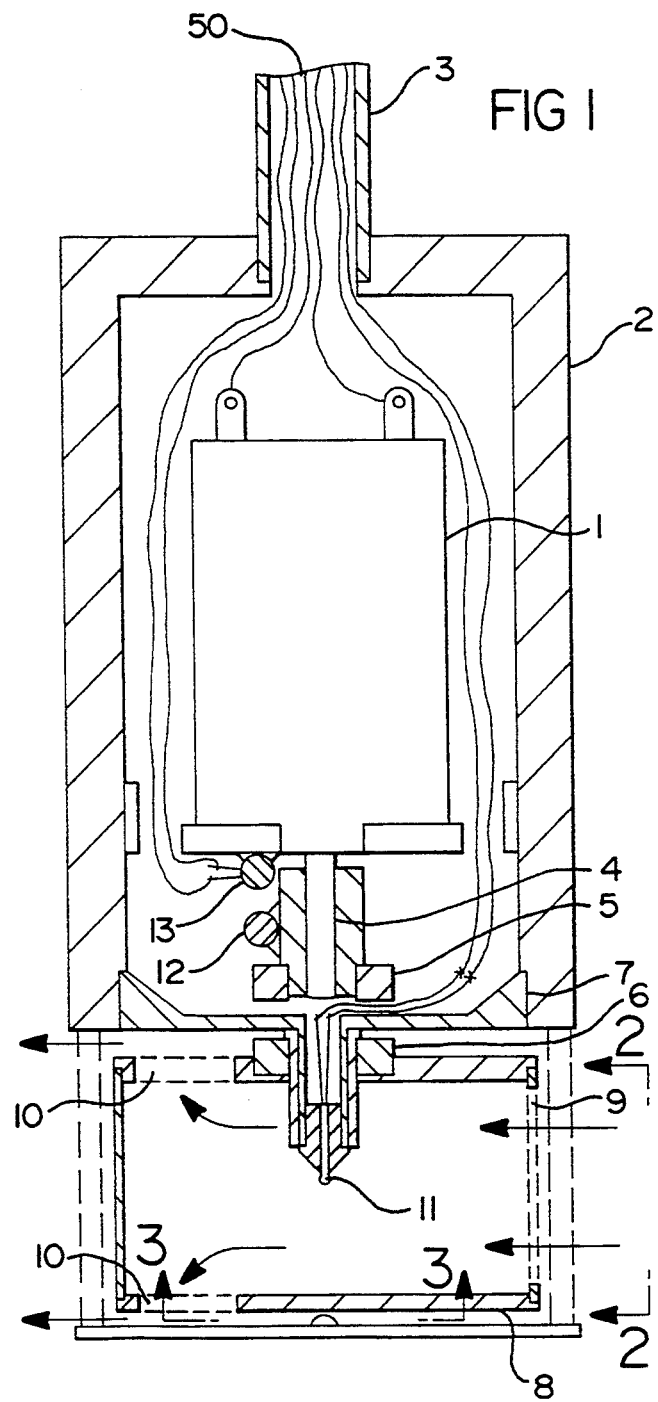
FIG. 1 illustrates a first embodiment of the invention wherein a hollow cylinder rotates for varying the fluid flow past the sensor.

As shown in FIG. 1, a motor with speed reducer 1 is mounted in a fluidproof housing 2. The housing 2 is attached to a tube 3 for accessing connecting wires 50 and for positioning the device, for example, in a monitoring well.

Figure 3:
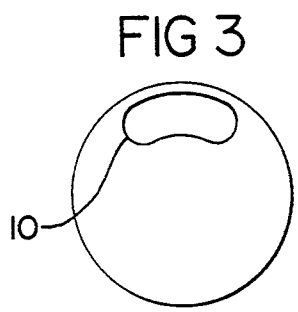
FIG. 3 illustrates a view of one of the exit slots in the rotary cylinder taken along the line 3—3 in FIG. 1.
Figure 2:
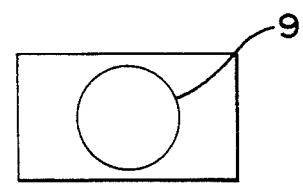
FIG. 2 depicts a view of the large entrance hole taken along the line 2—2 in FIG. 1.

An output shaft 4 from the motor/speed reducer 1 rotates a face-oriented multipole ring magnet 5. The ring magnet 5 is attracted to and drives a mating slave magnet 6 across a fluidproof barrier 7. The slave magnet 6 is attached to a hollow cylinder 8 which has a large entrance hole 9 on the right-hand portion of the drawing for fluid to enter, and two bean-shaped exit slots 10 on the left side of the drawing for the fluid to exit. FIG. 2 illustrates the large entrance hole 9 taken along the line 2—2 in FIG. 1. FIG. 3 shows one of the exits slots 10 shown in a view taken along the line 3—3 in FIG. 1.

In operation, the cylinder 8 rotates at a slow rate, typically from a fraction of a second per revolution to several tens of seconds per revolution, depending upon the design and components. Using a heated electrically-responsive temperature-sensitive sensing element, comprising a probe thermistor sensor 11 which has a 0.025" diameter sensing tip and a relatively high speed response, a rotational rate of several seconds per revolution yields full sensitivity.

Fluid enters the large entrance hole 9 at the greatest rate when the hole 9 directly faces the fluid flow stream. The fluid travels in past the sensor 11, cooling it and enabling it to produce a corresponding electrical signal. As the cylinder 8 rotates so that the hole 9 faces away from the fluid flow stream, the fluid flow is then largely on the outside of the cylinder 8 with a relatively small flow component affecting the sensor 11. In one complete revolution of the cylinder 8, the flow rate past the sensor 11 varies from a minimum to a maximum, thereby enabling its signal to varying accordingly.

If hole 9 is duplicated on the opposite side of cylinder 8 in place of the exit slots 3 in FIG. 3, the fluid flow past sensor 11 would vary twice from maximum to minimum in one complete revolution of cylinder 8, and the sensor 11 signal would vary accordingly and be ambiguous for determining direction.

The rotational rate of the cylinder 8 is maintained constant, and by establishing a rotational reference signal and measuring the time interval between that signal and the peak flow rate during each revolution of the cylinder 8, the angular direction of the peak rate may be determined. A magnet 12 is attached to and moved through an arc by shaft 4 so that its flux, once each revolution, causes a magnet reed switch 13 to cycle, thereby providing the reference signal.

A number of variations of the FIG. 1 embodiment are possible for achieving different performance characteristics.

Figure 4:
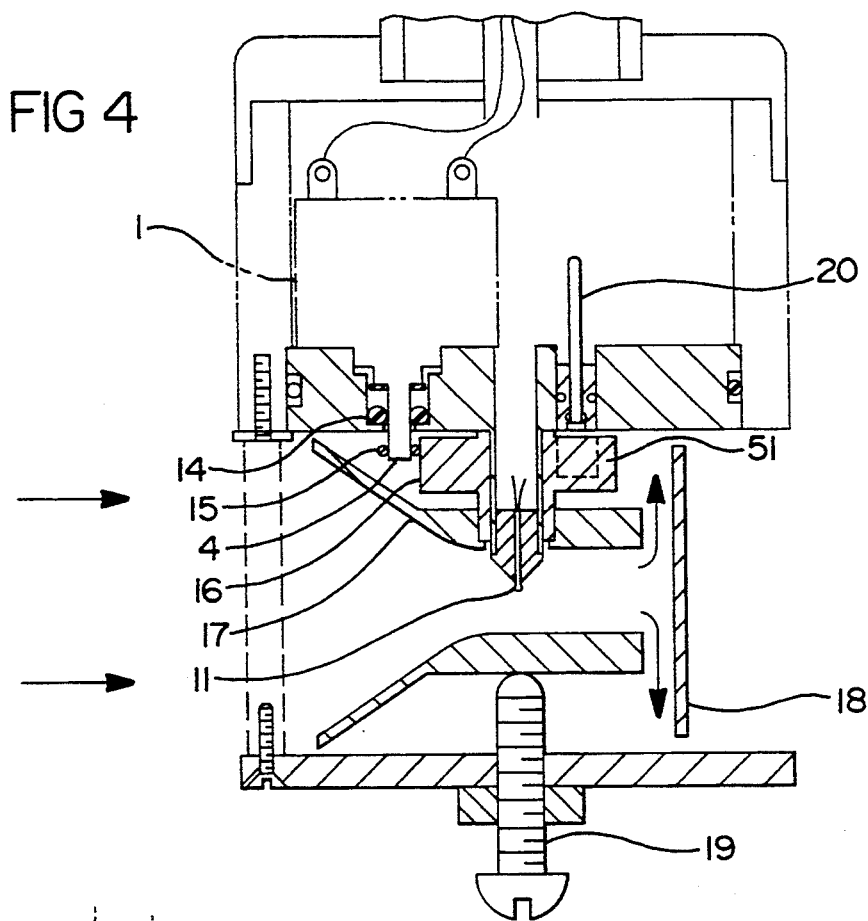
FIG. 4 depicts a second embodiment of the present invention having a rotary flow concentrator.

With reference to the FIG. 4 embodiment, the output shaft 4 of the motor/speed reducer 1 uses an O-ring seal 14 to prevent leakage. In addition, the output shaft 4 is provided with a direct friction drive 15 to a drum 16. The drum 16 rotates a flow concentrator 17 around the sensor 11, thereby providing the required flow modulation. Optionally, a backplate 18 may preferably, but not necessarily, be added to the concentrator 17 to improve its directivity.

In the FIG. 4 embodiment, a screw and locking nut assembly 19 retains the concentrator 17 in a stable position. It should be noted that in the FIG. 1 embodiment, the attractive effects of magnets 5 and 6 are used for this purpose.

The drum 16 preferably, but not necessarily, incorporates a vane 51 at one location on its underside. This vane 51 is used with a sensing electrode 20 and its associated electronic circuit as described in U.S. Pat. No. 4,829,833 to produce a rotation reference signal. The disclosure of U.S. Pat. No. 4,829,833 is incorporated herein by reference thereto. Alternatively, a photoelectric or magnet/magnetic reed switch means may also be used to establish a rotation reference signal. In the case of photoelectric means, a photoreflective mode is easy to implement, while with respect to the magnet/magnetic reed switch means, a small magnet may be mounted on the inside of the drum 16 with the reed switch being located on the inside of the housing.

The flow concentrator 17 effectively captures the fluid flow over a wide area, and concentrates that flow into a small area around the sensor 11, thereby enabling lower flow rates to be detected. Although the optional backplate 18 reduces the efficiency of the concentrator 17, the backplate 18 or its functional equivalent enables a more pronounced difference in the sensor 11 signal to be obtained when the flow is directly into concentrator 17 and when it has rotated by 180°.

Figure 6:
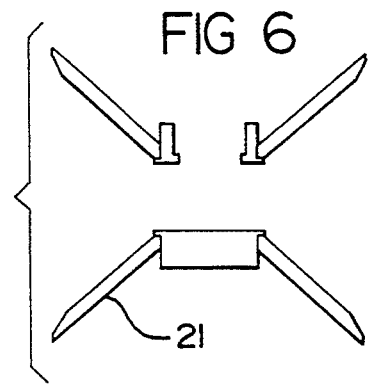
FIG. 6 illustrates a modified flow concentrator approximating the ideal shape of FIG. 5.
Figure 5:
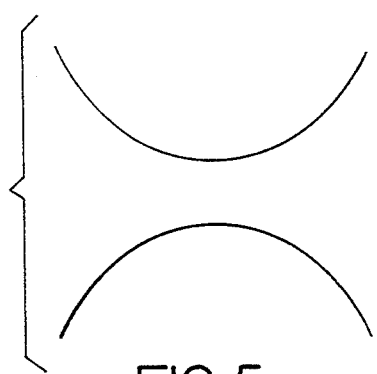
FIG. 5 shows an ideal shape for modifying the flow concentrator where directivity sensing is not required.

The concentrator 17 may be fairly large for a high concentration factor. However, if high directivity sensing is not required, a more efficient shape for the concentrator as shown in FIG. 6 as a modified concentrator 21 may be utilized to advantage. It should be noted that the modified concentrator 21 in FIG. 6 is an approximation to the ideal laminar venturi shape depicted in FIG. 5.

Because of the nonlinearities of the heated temperature sensor 11 itself, and also of its heat removal rate with flow rate, and nonlinearities related to the flow modulators and/or concentrators, the magnitude of the alternating signal produced will not be a linear representation of flow rate over a wide flow range. Conventional analog and/or digital techniques may be used for linearization. In addition, field-replaceable flow modulators and/or concentrators and/or adapters offering different concentration factors may be used to cover a very wide range of flow rates.

With regard to the embodiments discussed hereinabove, the flow rate being measured is made to vary periodically as it passes by the heated temperature sensor 11.

Figure 8:
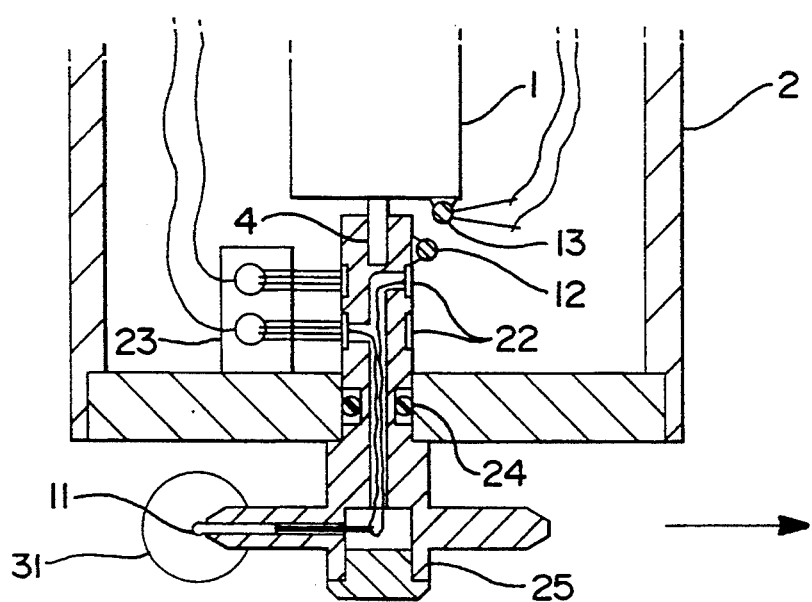
FIG. 8 illustrates another embodiment of the invention wherein the heated sensor is moved in the fluid medium.
Figure 9:
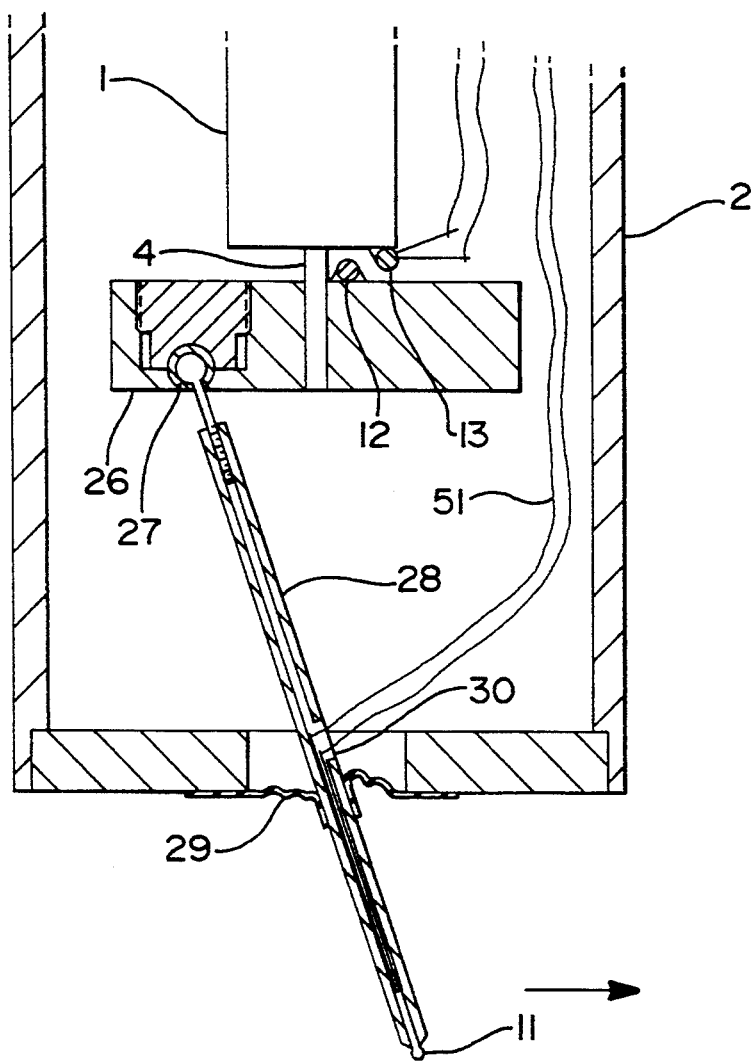
FIG. 9 depicts yet another embodiment of the present invention wherein the sensor is attached to a rod which is made to nutate.

With respect to the embodiments of the present invention illustrated in FIGS. 8 and 9, in a first mode of operation the heated temperature sensor 11 is physically moved in the fluid medium in a cyclic manner. The sensor 11 produces a signal which is at its greatest magnitude when the velocity difference between it and the fluid is maximum, and at its minimum magnitude when the velocity difference is at its minimum. The difference between the maximum and minimum signal peaks is a measure of flow rate. By making the cyclic flow rate greater than the highest flow rate required to be measured, a single maximum to minimum signal per rotational cycle is obtained which enables simple unambiguous directional sensing to be realized, thereby eliminating the need of any type of polarizing structure such as components 9, 10, and 18 shown in the previous figures.

FIG. 8 illustrates a device in which the heated temperature sensor 11 is moved in the fluid medium. Sensor 11 is mounted on the periphery of a disk assembly 25 which incorporates an O-ring 24 sealing the enclosure 2. The disk assembly 25 has two slip rings 22 which connect to the sensor 11. Slip ring brushes 23 and their connecting wires provide the interface for completing its external connections. Other means of electrically connecting to the sensor such as with a rotary transformer could also be employed.

The disk assembly 25 also mounts a magnet 12 which causes a magnet reed switch 13 to cycle thereby providing a directional reference signal. The disk assembly 25 is driven by an output shaft 4 emerging from a motor/speed reducer 1.

In a second mode of operation, the speed of the output shaft 4 is controlled so that the sensor 11 linear rate is equal to the fluid rate being measured. The sensor 11 output signal will have a double peaked or distorted response when the fluid rate is faster. This indication can be detected and with a feedback control enable the speed of the output shaft 4 to be controlled precisely. Because the sensor 11 linear rate can be accurately determined from the respective mechanical dimensions and the speed of shaft 4, any drifts related to it or its circuits including scale buildup which affect only the magnitude of its signal become a relatively small factor in the overall accuracy of the complete measurement instrument. The uncompensated output from such a flow detector will inherently have a high linearity over a wide flow range.

It is possible to incorporate both of the above-mentioned modes in the same instrument whereby the first mode is used to quickly determine a flow rate with moderate precision, while the second mode though possibly requiring more measurement time, improves the precision of that measurement. It is quite practical when incorporating a digital processor within the instrument, to have an automatic switchover between the first and second modes whereby the processor, using the fluid rate obtained during the first operation mode, automatically initially programs the speed of shaft 4 accordingly, and then makes minor adjustments to the speed based upon operational factors relating to the second mode of operation.

Optionally, for the purpose of enhancing the double peaked or distortion detection point or reducing the minimum detectable flow rate, a small cylinder and/or concentrator 31 may be placed around the sensor 11.

Figure 7:
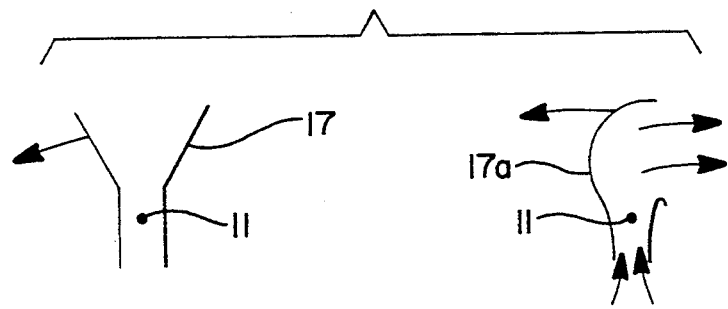
FIG. 7 shows a further modified flow concentrator to achieve a pump flow past the sensor.

In FIG. 7, concentrator 17 (as viewed from the top) is modified as 17a so that during rotation typical of FIG. 4, it exhibits fluid pumping action and generates a constant flow past sensor 11. This pumped flow performs the same function as the cyclic movement of sensor 11 in FIGS. 8 and 9, and the sensor 11 signals and processing are also the same. The concentrator is illustrated radically altered as 17a to emphasize a shape which will produce a pumped flow. Only a small change is actually required for very low rates typically measured.

FIG. 9 illustrates a variant or modification of the embodiment shown in FIG. 8 whereby the sensor 11 is attached to a rod 28 which is made to nutate, rather than rotate. Wires 52 for the sensor 11 may preferably, but not necessarily, be routed directly out of the housing 2 without the need for slip rings 22 or other type of rotary isolation. The wires 52 pass through a small hole 30 in the rod 28 which is close to the pivot point on a diaphragm 29 so that the wires 52 receive minimal movement.

The diaphragm 29 provides the required flexibility for the nutating action of the rod 28 while maintaining the environmental seal. Alternatively, a boot, a bellows or an O-ring may be used.

The mechanically driven end of rod 28 is a ball 27 in a socket provided by a drive wheel 26. A magnet 12 attached to the drive wheel 26, and a magnetic reed switch 13 provides the directional reference signal.

Figures 10, 10A:
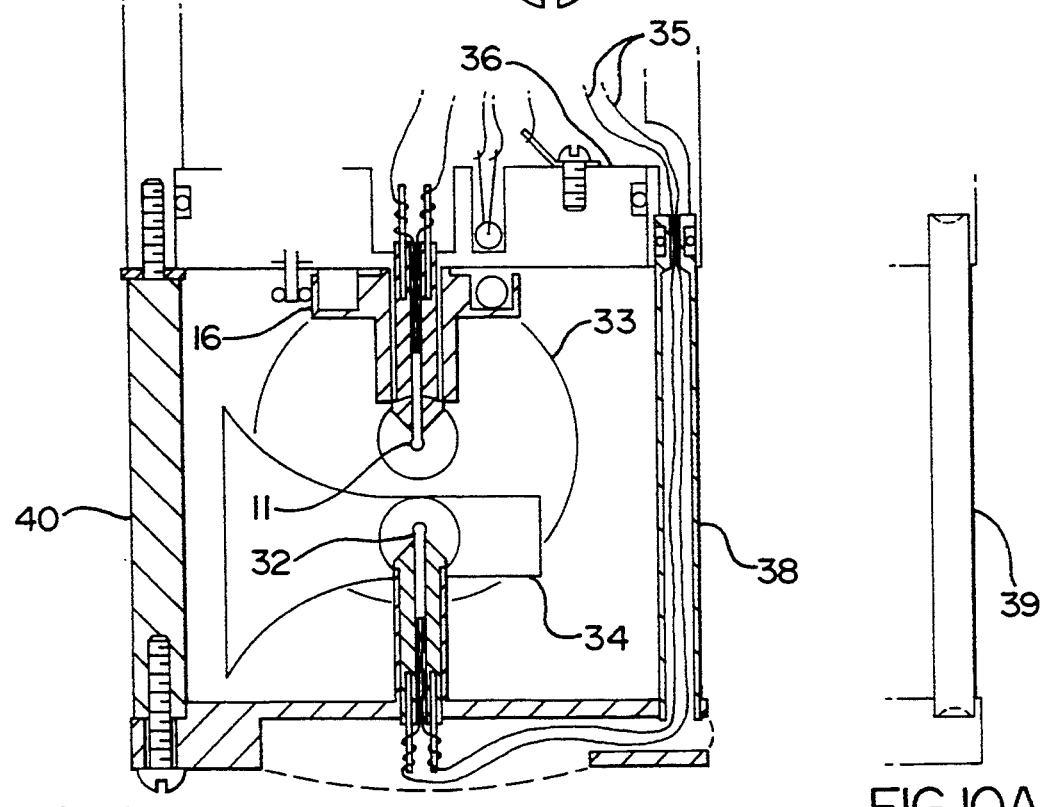
FIG. 10 illustrates another embodiment of the present invention having two balanced heat temperature sensors.
FIG. 10A shows a solid support post for the FIG. 10 embodiment.

FIG. 10 illustrates another embodiment of the present invention which is a balanced form of the FIG. 4 sensor configuration. In FIG. 10, two heated temperature sensors 11 and 32 are used with associated flow modulators/concentrators 33 and 34, respectively, which are attached to each other and the drum 16. The concentrators 33 and 34 are oriented at 90° relative to each other so that when their respective sensors 11 and 32 are connected to a bridge or other type of differential sensing circuit, their signals representing modulation components are additive, while those representing common mode signals, such as drifts due to ambient temperature, are cancelled.

If a means for eliminating the directional ambiguity such a fluid pump (17a) were used, the concentrators 33 and 34 would be oriented either at 90° relative to each other or in opposing directions and electrically connected for modulating signal adding and common mode signal cancelling.

In FIG. 10, connecting wires 35 may preferably, but not necessarily, be routed through a hollow support post 38 to the sensor 32. The other support posts 39 and 40 are either threaded as shown in FIG. 10 or solid as shown in FIG. 10A. The threaded posts 40 hold the mechanism together, while the unthreaded support posts 39 provide distance control and compressive strength. An environmental sealant 37 is also provided.

The embodiment and configuration of FIG. 10 enables a much larger (typically twice) the modulation signal to be realized, while drastically reducing (typically by 10 to 100) the common mode signal. If the signal from a single sensor 11 is satisfactory and a smaller amount of common mode signal rejection is acceptable, then the sensor 32 can serve as an ambient temperature reference and be located instead on a suitable inside surface 36 thereby enabling the simple structure of FIG. 4 to be utilized.

It should be noted that the other illustrated embodiments and configurations may similarly have dual modulated flow sensors, or alternatively a single modulated sensor and a second reference sensor.

Figure 11:
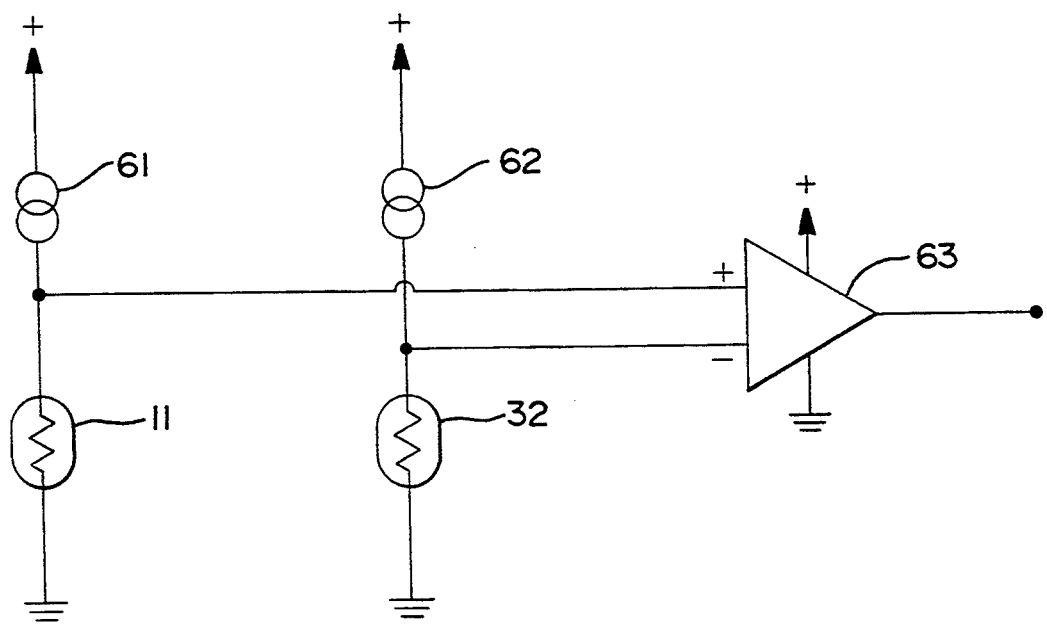
FIG. 11 illustrates a electrical block diagram for the present invention.

FIG. 11 illustrates a block diagram for the electronics sensing circuit which may be basically the same for all of the mechanical configurations described hereinabove. A thermistor sensor 11 with a high negative temperature coefficient is preferably, but not necessarily, selected as the heated temperature sensor 11 because it is available in small sizes and requires low operating power. A typical thermistor 11 for use in the present invention would preferably, but not necessarily, have 10,000 ohms of resistance at 25° C., be glass encapsulated with a maximum bead diameter of 0.025", and require about 2 milliamps to self heat well into its negative resistance mode for satisfactory sensitivity. A temperature compensated constant current source 61 is preferred for providing thermistor excitation.

As shown in FIG. 11, a second modulation sensor such as 32 (or a fixed resistor or reference sensor) is provided with thermistor excitation by a temperature compensated constant current source 62. The outputs of sensors 11 and 32 are fed to a differential amplifier 63. The output signal from differential amplifiers 63 may be fed to a recorder (not shown).

Peak-to-peak output voltages from the thermistor 11 as shown in the FIG. 4 embodiment have been in the range of tens of millivolts corresponding to flow rates in the feet per hour range. When removing the DC offset voltage, this relatively high output may be used directly with sensitive chart recorders to display flow rate and direction. A more sophisticated approach may make use of an analog-to-digital converter to provide a suitable data stream for digital computer processor display and storage. Such a converter may also incorporate DC offset cancellation to allow its resolution to be most effectively used.

As mentioned above, it is possible to use a second thermistor 32 similar to the first thermistor 11 but protected so that it senses only fluid temperature to adjust the DC cancellation level for a dynamically maximum resolution to be achieved. The signal from the second sensor 32 may also be used to fine tune the calibration constant for improving measurement precision over a very wide temperature range.

As shown in FIG. 11, the main components of the electronics circuit may, for example, comprise two constant current sources 61 and 62 one for each sensor 11 and 32, respectively, and a balanced differential amplifier 63. The sensors 11 and 32 may be operated in a constant current balance mode and trimmed with temperature balancing potentiometers, or alternatively in a single modulation sensor mode with only the reference sensor being affected by the balance adjustment. Balanced differential amplifier 63 may also be trimmed for minimum offset. Common mode rejection enables greater signal resolution and easier processing to be realized, especially when digital processing and/or display is utilized. The sensor 11 and related components may be operated from AC as in an AC bridge circuit, and thereby electrically connected inductively with a rotary transformer across the fluidproof mechanical barrier.

A representative model of the FIG. 4 embodiment currently being tested, exhibits a low flow threshold of about 0.5 feet per hour. With further developments and refinements, a threshold of about 1/10 of this value seems to be achievable.

The present invention may be embodied in other specific forms without departing from the spirit or essential characteristics thereof. The embodiments described hereinabove are therefore to be considered in all respects as illustrative, and not restrictive. The scope of the invention is indicated by the appended claims, rather than by the foregoing description. Furthermore, all changes which come within the meaning and range of equivalency of the appended claims are therefore intended to be embraced therein.

I claim:

1. A flow meter for measuring fluid flow rate, comprising:
   one or more heated electrically-responsive temperature-sensitive sensing elements;
   at least one of said heated electrically-responsive temperature-sensitive sensing elements generating an electrical signal in response to temperature changes produced by the removal of heat therefrom by fluid flow to be measured;
   first means for producing cyclically relative motion between said fluid flow and said at least one heated electrically-responsive temperature-sensitive sensing element; and
   second means connected to said at least one heated electrically-responsive temperature-sensitive sensing element for measuring the magnitude of the cyclic electric signal corresponding to the relative motion between said one heated, electrically-responsive temperature sensitive sensing element and said rate of fluid flow to be measured.

2. A flow meter according to claim 1, wherein:
   said first means includes means for producing continuous pumped fluid flow past said at least one heated electrically-responsive temperature-sensitive sensing element.

3. A flow meter according to claim 2, including:
   a mechanism for cyclically sensing said fluid flow; and
   wherein said pumped fluid flow is aided or opposed by said fluid flow to be measured as said mechanism for sensing said fluid flow to be measured continues throughout its cycle.

4. A flow meter according to claim 1, including:

means for determining direction of flow of said fluid flow to be measured.

5. A flow meter according to claim 1, wherein:
said first means for producing cyclically relative motion between said fluid flow and said at least one heated electrically-responsive temperature-sensitive sensing element comprises third means for maintaining said at least one heated electrically-responsive temperature-sensitive sensing element fixed in position, and fourth means for cyclically controlling fluid flow past said at least one heated electrically-responsive temperature-sensitive sensing element from a minimum to a maximum condition.

6. A flow meter according to claim 1, wherein:
said first means for producing cyclically relative motion between said fluid flow and said at least one heated electrically-responsive temperature-sensitive sensing element comprises means for cyclically moving said at least one heated electrically-responsive temperature-sensitive sensing element within said fluid flow.

7. A flow meter according to claim 6, wherein:
said means for cyclically moving said at least one heated electrically-responsive temperature-sensitive sensing element includes a rotary disk to which said at least one heated electrically-responsive, temperature-sensitive sensing element is affixed.

8. A flow meter according to claim 6, wherein:
said means for cyclically moving said at least one heated electrically-responsive temperature-sensitive sensing element in said fluid flow includes an elongated component to which said at least one heated electrically-responsive temperature-sensitive sensing element is affixed, and means for nutating said elongated component.

9. A flow meter according to claim 1, wherein:
said first means causes said fluid flow to be cyclically modulated from a minimum condition to a maximum condition by mechanical means within the vicinity of said at least one heated electrically-responsive temperature-sensitive sensing element; and
said predetermined portion of said electrical signal is a magnitude of a modulation component of the electrical signal which is representative of fluid flow rate.

10. A flow meter for measuring fluid flow rate, comprising:
a fluidproof housing;
motor means mounted within said fluidproof housing;
at least one heated, electrically-responsive temperature-sensitive sensing element disposed outside of said fluidproof housing for generating an electrical signal in response to temperature changes produced by the removal of heat from said at least one sensing element by a fluid flow to be measured;
fluid control means disposed outside of said fluidproof housing for generating cyclic relative motion between said sensing element and said fluid flow;
driving means for transferring movement from said motor means to said fluid control means for producing cyclically relative motion between said fluid flow and each said heated, electrically-responsive temperature-sensitive sensing element; and
electronic means connected to said heated, electrically-responsive temperature-sensitive sensing element for measuring a magnitude of the electric signal corresponding to the relative motion between said sensing element and the rate of said fluid flow to be measured.

11. A flow meter according to claim 10, including:
said motor means being provided with a rotary output shaft;
a fluidproof barrier disposed between said output shaft and said heated electrically-responsive temperature-sensitive sensing element;
a first magnetic device disposed within said fluidproof housing and adapted to rotate in unison with said output shaft; and
second magnetic means disposed outside of said fluidproof barrier and affixed to said fluid control means, so that said second magnetic means rotates in unison with said first magnetic means to cause rotation of said fluid control means.

12. A flow meter according to claim 10, including:
a first heated electrically-responsive temperature-sensitive sensing element provided with an associated first fluid control means for controlling the amount of fluid flowing past said first heated electrically-responsive temperature-sensitive sensing element;
a second heated electrically-responsive temperature-sensitive sensing element provided with an associated second fluid control means for controlling the amount of fluid flowing past said second heated electrically-responsive temperature-sensitive sensing element; and
said first fluid control means being oriented at a predetermined direction relative to said second fluid control means.

13. A flow meter according to claim 10, including:
an output shaft of said motor means;
a disk assembly driven by said output shaft; and
said heated electrically-responsive temperature-sensitive sensing element being affixed to said disk assembly to be rotated therewith.

14. A flow meter according to claim 10, including:
an output shaft of said motor means;
a drive wheel affixed to said output shaft;
an elongated component movably affixed to said drive wheel by way of a ball and socket arrangement;
fluidtight means separating a portion of said fluidtight enclosure from said fluid flow;
a portion of said elongated component extending through said fluid tight means from inside said fluidtight enclosure to said fluid flow; and
said heated electrically-responsive temperature-sensitive sensing element being affixed to a portion of said elongated component within said fluid flow, so that said sensing element is caused to nutate by rotation of said drive wheel with a pivot for said elongated component being in the vicinity of said fluidtight means.

15. A method of measuring fluid flow rate, comprising the steps of:
disposing a heated, electrically-responsive temperature-sensitive sensing element within a fluid flow environment for generating an electrical signal in response to temperature changes produced by the removal of heat from said sensing element by a fluid to be measured;
producing cyclically relative motion between said fluid flow and said heated, electrically-responsive temperature-sensitive sensing element;

generating a cyclic electrical signal in response to temperature changes produced by the removal of heat from said heated, electrically-responsive temperature-sensitive sensing element by said fluid flow past said sensing element; and sensing the magnitude of the cyclic portion of said electrical signal to obtain said rate of fluid flow to be measured.

16. A method according to claim 15, including the steps of:

moving said heated electrically-responsive temperature-sensitive sensing element at a linear rate which is substantially equal to the fluid rate being measured.

17. A method according to claim 15, including the steps of:

moving said heated electrically-responsive temperature-sensitive sensing element within said fluid flow in a cyclic manner;

producing an electrical signal which is at its greatest magnitude when the velocity difference between said sensing element and said fluid flow is maximum, and at its minimum magnitude when the velocity difference between said sensing element and said fluid flow is minimum; and whereby the difference between maximum and minimum signal peaks is a measure of flow rate.

18. A method according to claim 15, including the step of:

continuously pumping fluid flow past said heated electrically-responsive temperature-sensitive sensing element.

19. A method according to claim 18, wherein:

the pumped fluid flow is aided or apposed by said fluid flow to be measured as a mechanism for sensing fluid flow to be measured continues throughout its cycle.

20. A method according to claim 15, including the steps of:

determining direction of flow of said fluid flow to be measured.

* * * * *